United States Patent
Massaro, Jr.

(10) Patent No.: US 9,557,686 B2
(45) Date of Patent: Jan. 31, 2017

(54) SPRING BEARING FOR USE IN A DEVELOPER CARTRIDGE ROLLER SYSTEM

(71) Applicant: FLO-TECH, LLC, Middletown, CT (US)

(72) Inventor: Peter Vincent Massaro, Jr., West Haven, CT (US)

(73) Assignee: Flo-Tech, LLC, Middletown, CT (US)

(*) Notice: Subject to any disclaimer, the term of this patent is extended or adjusted under 35 U.S.C. 154(b) by 0 days.

(21) Appl. No.: 14/695,420

(22) Filed: Apr. 24, 2015

(65) Prior Publication Data

US 2016/0313692 A1    Oct. 27, 2016

(51) Int. Cl.
| G03G 15/08 | (2006.01) |
| F16C 33/00 | (2006.01) |
| G03G 15/09 | (2006.01) |
| F16C 33/20 | (2006.01) |
| F16C 33/04 | (2006.01) |

(52) U.S. Cl.
CPC ......... G03G 15/0935 (2013.01); F16C 33/046 (2013.01); F16C 33/201 (2013.01); F16C 2324/16 (2013.01)

(58) Field of Classification Search
CPC ............ G03G 15/0808; G03G 15/0935; G03G 2215/0609; F16C 33/046; F16C 33/201; F16C 2324/16; F16C 23/046; D21G 1/02; D21G 1/0226
USPC .................. 399/267, 276, 277, 279; 384/273
See application file for complete search history.

(56) References Cited

U.S. PATENT DOCUMENTS

| 2,362,566 A  * | 11/1944 | Lappert .................. F16C 33/22 384/273 |
| 3,219,014 A  * | 11/1965 | Mott .................. G03G 15/0928 399/270 |
| 3,484,143 A  * | 12/1969 | Sibley .................. F16C 17/026 384/108 |
| 5,236,080 A  * | 8/1993 | Baum .................... D06C 3/023 198/500 |
| 5,805,958 A  * | 9/1998 | Fisk .................... F16C 33/7886 384/130 |
| 8,096,709 B2 * | 1/2012 | Maruyama .......... F16C 33/1065 384/292 |
| 2008/0095481 A1* | 4/2008 | Kummings ......... B60B 17/0006 384/158 |
| 2012/0018284 A1* | 1/2012 | Pierret ..................... D01G 1/04 198/835 |
| 2012/0177311 A1* | 7/2012 | Isayama ................ F16H 57/082 384/416 |
| 2014/0366318 A1* | 12/2014 | Barth ..................... F16C 33/14 16/2.5 |

FOREIGN PATENT DOCUMENTS

| CN | 201810676 U | * | 4/2011 | |
| DE | 2659562 A1 | * | 7/1978 | ............. B60R 22/34 |
| JP | 08135659 A | * | 5/1996 | |
| JP | 2006170421 A | * | 6/2006 | |

* cited by examiner

*Primary Examiner* — Robert Beatty
(74) *Attorney, Agent, or Firm* — Bachman & LaPointe, P.C.

(57) ABSTRACT

The present disclosure is directed to a spring bearing which is used in a roller system for a developer cartridge. The spring bearing has a front surface and a rear surface and an angled relief cut extending from the front surface to the rear surface.

17 Claims, 6 Drawing Sheets

SPRING BEARING FOR USE IN A DEVELOPER CARTRIDGE ROLLER SYSTEM

BACKGROUND

The present disclosure relates to a spring bearing which is used in a roller system in a developer cartridge.

Roller systems used in developer cartridges typically having a magnet roller which rotates during operation. Bearings are provided on opposite sides of the magnet roller to facilitate rotation of the magnet roller. These bearings have a short life span as a result of the stress forces created during rotation of the magnet roller. This necessitates frequent replacement of the roller systems.

It would be desirable to have a roller system with an extended life span.

SUMMARY

In accordance with the present disclosure, there is provided a spring bearing which broadly has a front surface and a rear surface and an angled relief cut extending from the front surface to the rear surface.

In another and alternative embodiment, the spring bearing may further have a first flat exterior surface on a first side and a second flat exterior surface located on a second side opposed to the first side.

In another and alternative embodiment, the angled relief cut may be angled with respect to the first and second flat exterior surfaces.

In another and alternative embodiment, the spring bearing may further have a front portion and a back portion and the front portion forms a lip with the back portion.

In another and alternative embodiment, the spring bearing may further have a foot extending from an outer surface of the back portion to one of the first and second flat exterior surfaces.

In another and alternative embodiment, the foot may have a constant thickness portion and two opposed arcuate portions adjacent the constant thickness portion.

In another and alternative embodiment, the spring bearing may further have an internal opening extending from the front surface to the rear surface.

In another and alternative embodiment, the internal opening may have a linear wall extending from the rear surface and an angled wall extending from the front surface and mating with the linear wall.

In another and alternative embodiment, the spring bearing may be formed from a material selected from the group consisting of nylon, acetal, polytetrafluoroethylene (PTFE), ultra high molecular weight polyethylene (UHMW) and IGUS® IGLIDE® J plastic material.

Further in accordance with the present disclosure, there is provided a roller system for a developer cartridge which broadly comprises a magnet roller, a magnet roller sleeve surrounding the magnet roller, a first bushing abutting the magnet roller sleeve, and a first spring bearing abutting the first bushing, the first spring bearing having a front surface and a rear surface and an angled relief cut extending from the front surface to the rear surface.

In another and alternative embodiment, the roller system may further comprise a first endpiece adjacent the first spring bearing and the first spring bearing mating with the first endpiece.

In another and alternative embodiment, the roller system may further comprise the first spring bearing having a first flat exterior surface on a first side and a second flat exterior surface on a second side opposed to the first side.

In another and alternative embodiment, the roller system may further comprise the first endpiece having a flat surface and one of the first and second flat exterior surfaces being aligned parallel to the flat surface of the first endpiece.

In another and alternative embodiment, the roller system may further comprise the first endpiece having an opening and a notch adjacent the opening and the first spring bearing having a foot which fits into the notch.

In another and alternative embodiment, the roller system may further comprise the first spring bearing having a front portion and a back portion and the back portion fitting in the opening in the first endpiece.

In another and alternative embodiment, the first spring bearing may have a lip formed by the front portion and the lip abutting the first endpiece.

In another and alternative embodiment, the roller system may further comprise a drive gear for driving the magnet roller and the drive gear may be housed in an exterior portion of the first endpiece.

In another and alternative embodiment, the roller system may further comprise an outer endpiece abutting the drive gear.

In another and alternative embodiment, the roller system may further comprise a hopper magnetic roller assembly having an arcuate portion for housing the magnet roller with the magnet roller sleeve.

In another and alternative embodiment, the roller system may further comprise a doctor blade and a sealing blade attached to the hopper magnetic roller assembly.

In another and alternative embodiment, the roller system may further comprise a second bushing abutting a second end of the magnet roller sleeve, a second spring bearing abutting the second bushing, and a second endpiece mating with the second spring bearing.

In another and alternative embodiment, the roller system may further comprise each of the first and second spring bearings being formed from a material selected from the group consisting of nylon, acetal, polytetrafluoroethylene (PTFE), ultra high molecular weight polyethylene (UHMW), and IGUS® IGLIDE® J plastic material.

Other details of a spring bearing for a toner cartridge roller system are set forth in the following detailed description and the accompanying drawings, wherein like reference numerals depict like elements

DETAILED DESCRIPTION

Figure 1:
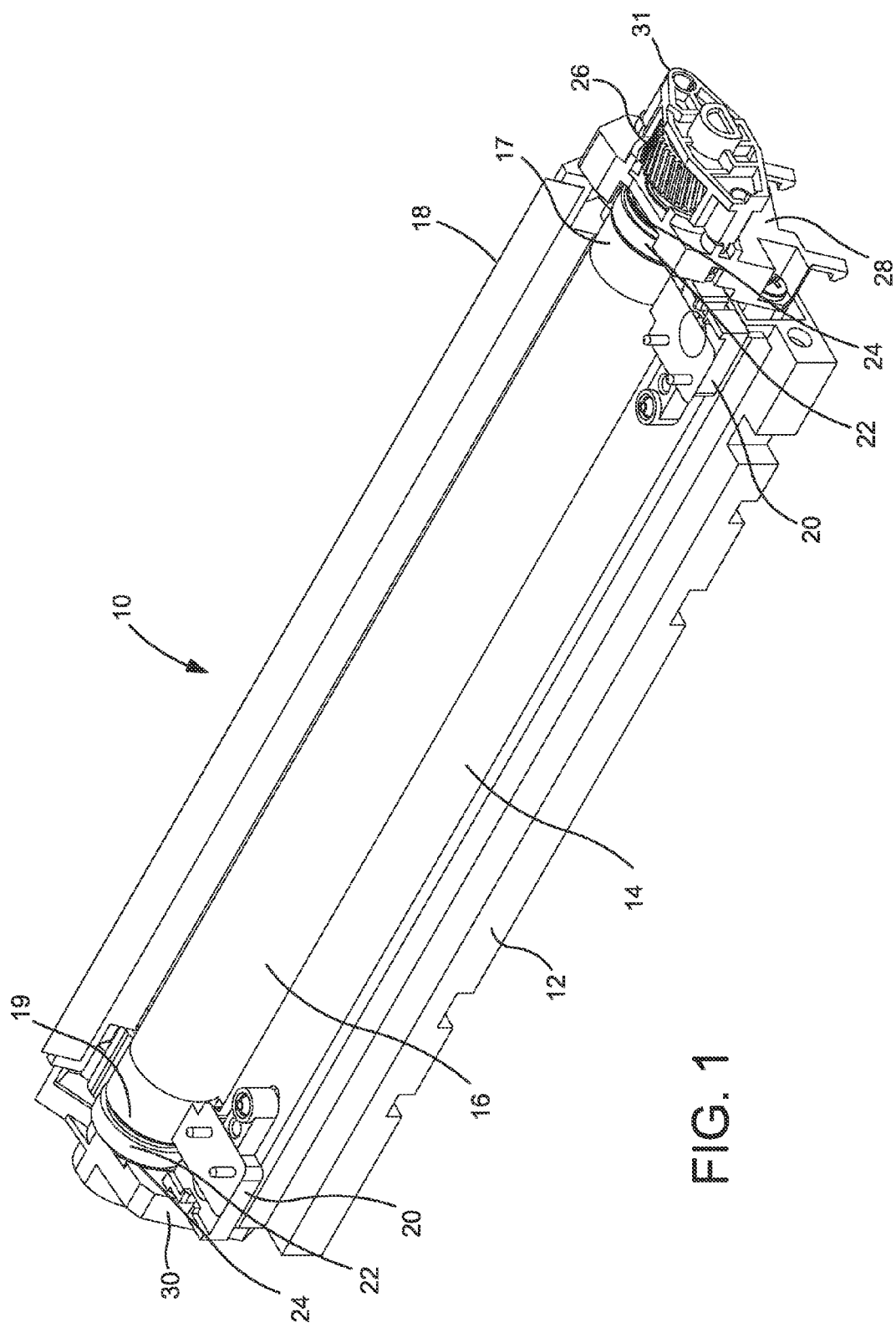
FIG. 1 illustrates a roller system which is used in a toner cartridge.
Figure 2:
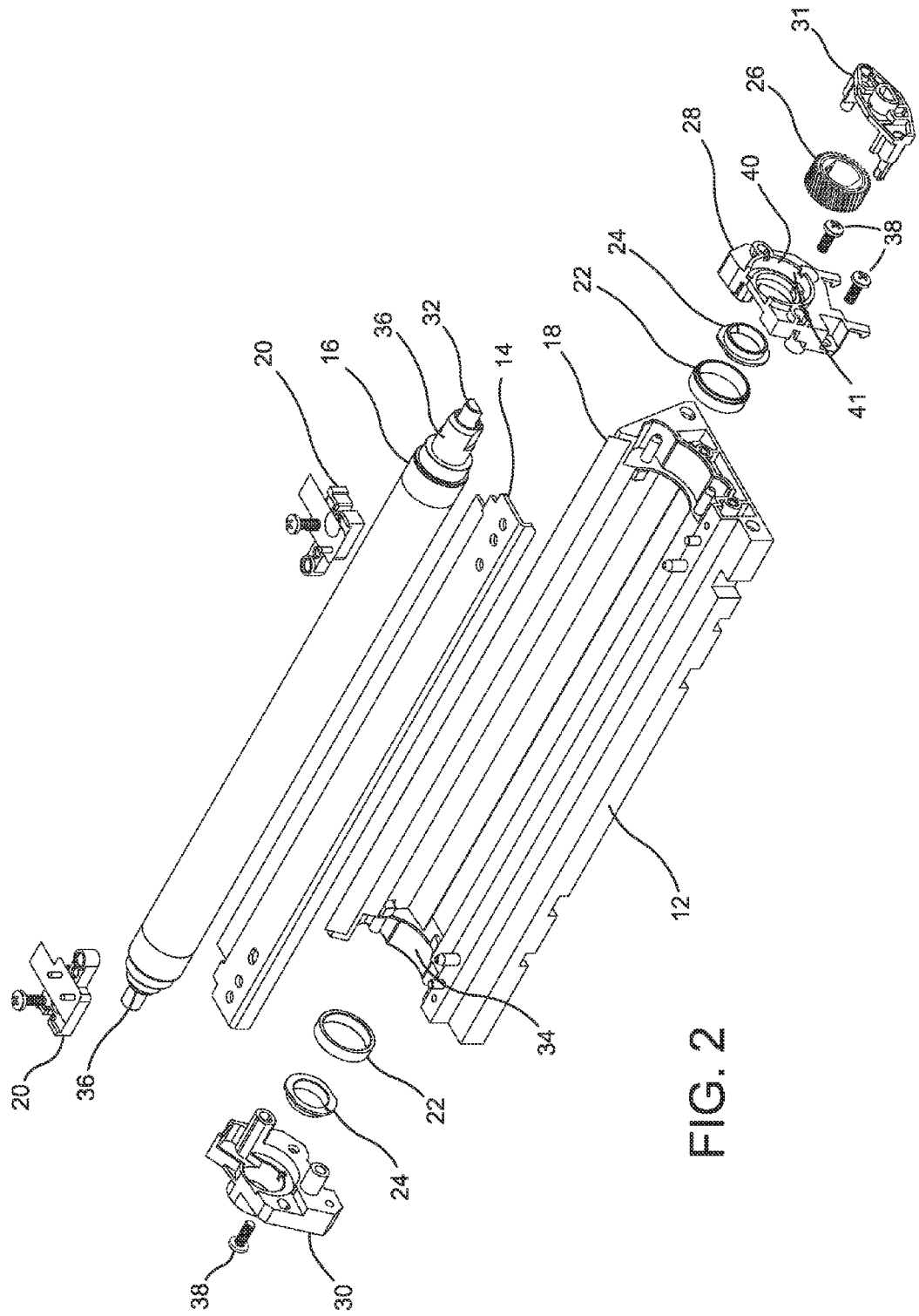
FIG. 2 is an exploded view of the roller system of FIG. 1.

Referring now to the drawings, FIGS. 1 and 2 illustrate a roller system 10 which may be used in a developer cartridge used in a printing and/or copying machine. The roller system 10 may include a hopper magnetic roller assembly 12, a doctor blade 14, a magnet roller sleeve 16, and a sealing blade 18. The doctor blade 14 may have a wiper tab 20 located on each side of the doctor blade 14 for securing the doctor blade 14 to the hopper magnetic roller assembly 12.

The roller sleeve 16 may have a bushing 22 which abuts the roller sleeve 16 at side ends 17 and 19. A spring bearing 24 may be positioned adjacent each of the bushings 22. A drive gear 26 may be positioned on one side of the roller sleeve 16 for driving the roller sleeve 16 and the magnetic roller 32 located therein. The drive gear 26 may be connected to any suitable drive system known in the art. The roller system 10 further includes inner endpieces 28 and 30 which house the spring bearings 24 and an outer endpiece 31 which houses the drive gear 26. The inner endpieces 28 and 30 and the outer endpiece 31 may be secured to the hopper magnetic roller assembly 12 using any suitable fastening/securing devices known in the art.

As can be seen from FIG. 2, the magnetic roller sleeve 16 surrounds an internal magnetic roller 32. The roller sleeve 16 is positioned within an arcuately shaped portion 34 of the hopper magnetic roller assembly 12. The bushings 22 are positioned on the ends 36 of the roller sleeve 16 so as to abut the roller sleeve 16. The spring bearings 24 are then positioned adjacent the bushings 22. The bushings 22 and the spring bearings 24 may be secured in place by one of the inner endpieces 28 and 30 which may be secured to the hopper magnetic roller assembly 12 by a suitable fastener such as screws/bolts 38. The drive gear 26 may then be positioned within an outer portion 40 of the inner endpiece 28. The outer portion 40 may have an arcuately shaped opening 41 for receiving the drive gear 26. The drive gear 26 may be connected to the magnetic roller 32 and the magnetic roller sleeve 16 so as to rotate the magnetic roller 32 and the surrounding roller sleeve 16. The outer endpiece 31 covers the drive gear 26 and secures the drive gear 26 in position relative to the hopper magnetic roller assembly 12. The outer endpiece 31 may be fastened or otherwise connected to the outer portion 40 of the inner endpiece 28. The inner endpiece 30 may be used to secure the bushing 22 and the spring bearing 24 in position on the opposite side 36 of the magnetic roller sleeve 16.

Figure 3:
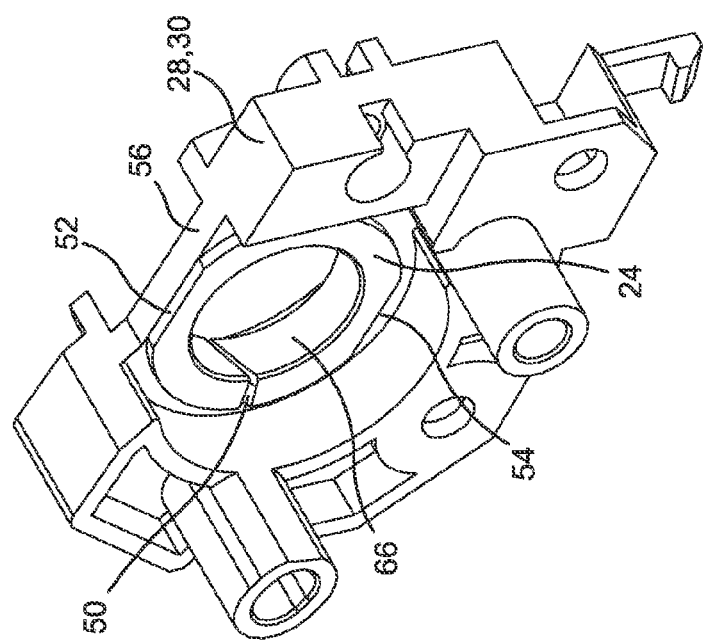
FIG. 3 illustrates a spring bearing positioned within an inner endpiece.

FIG. 3 illustrates one of the spring bearings 24 positioned within one of the inner endpieces 28 and 30. As can be seen from FIG. 3, each of the spring bearings 24 has a spring relief cut 50. The spring relief cut 50 is located between two flat surfaces 52 and 54. The flat surface 52 is aligned parallel with a flat surface 56 on the inner endpiece 28, 30.

Figure 4:
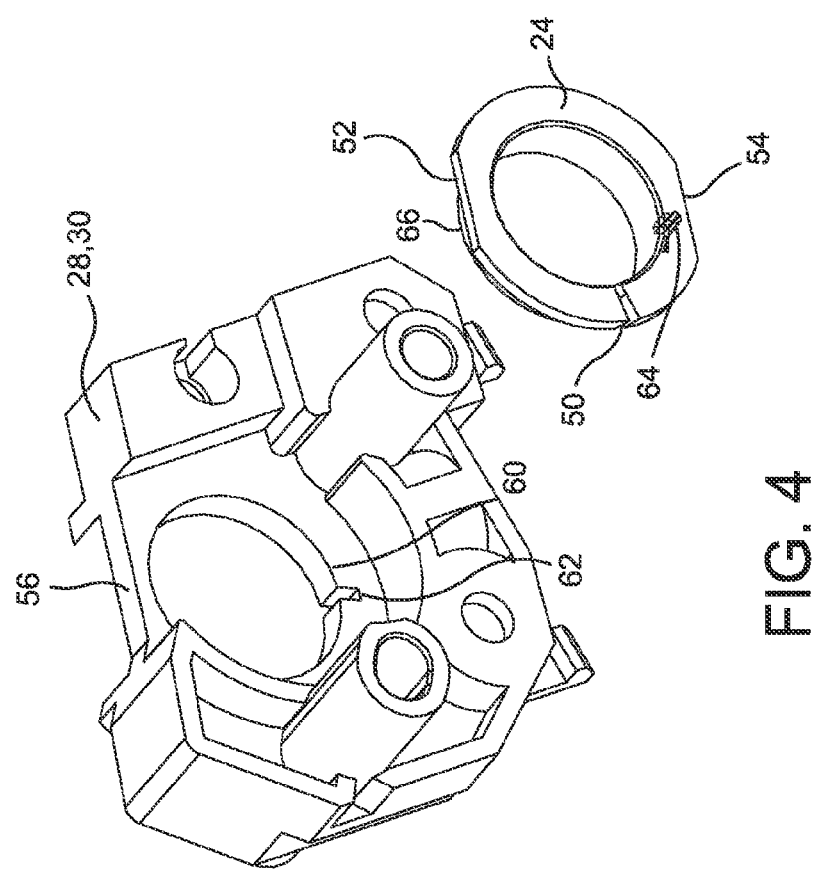
FIG. 4 is an exploded view of the spring bearing/inner endpiece system of FIG. 3.

FIG. 4 is an exploded view of the spring bearing/end piece arrangement of FIG. 3. The endpiece 28, 30 has an opening 60 into which a back portion 66 of the spring bearing 24 fits. The opening 60 includes a notch 62 in which a foot 64 on the spring bearing 24 is positioned so that the surfaces 52 and 56 align parallel to each other.

Figure 6:
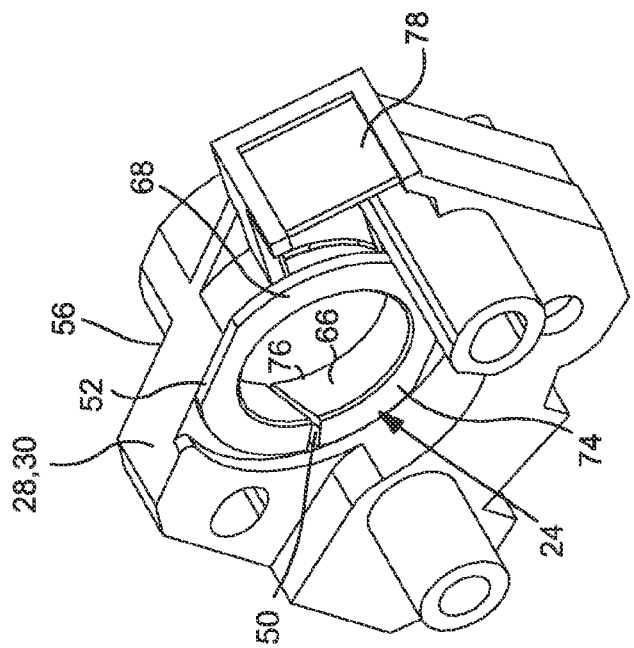
FIG. 6 is another view of the spring bearing/inner endpiece system of FIG. 3.
Figure 5:
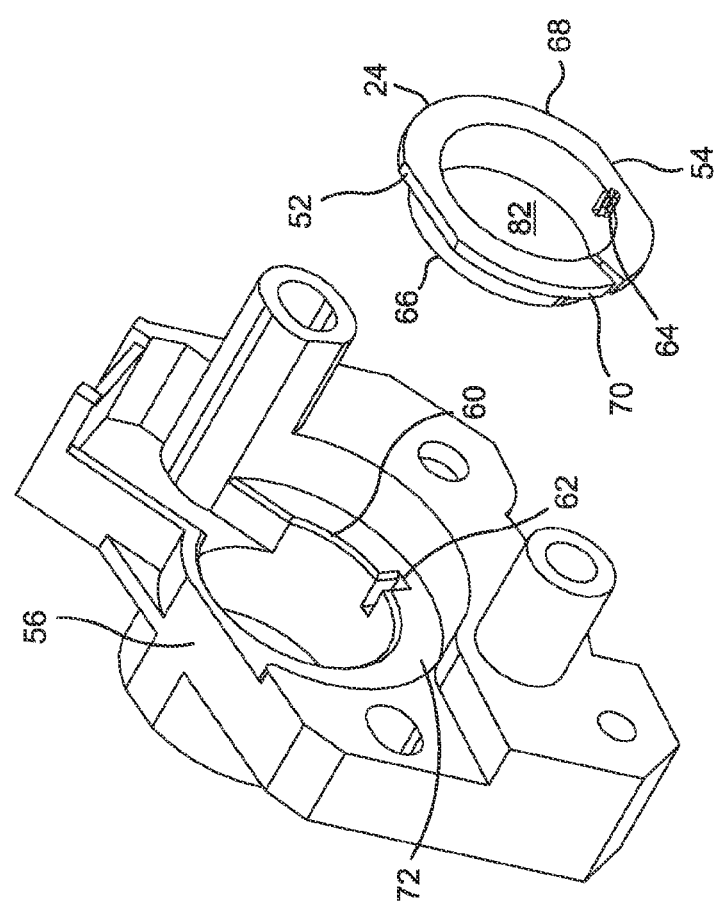
FIG. 5 is another view of the spring bearing/inner endpiece system used in the roller system of FIG. 3.

As can be seen in FIG. 5, each spring bearing 24 has a back portion 66 which is shaped and dimensioned to fit within the opening 60. Each spring bearing 24 has a front portion 68 which has a larger outer dimension than the outer dimension of the back portion 66 so as to form a lip 70 which abuts the sidewall 72 of the endpiece 28, 30 surrounding the opening 60. As can be seen from FIG. 6, the spring relief cut 50 extends from the front surface 74 of the front portion 68 to rear surface 76 of the back portion 66. It also extends from the outer surfaces of the front portion 68 and the back portion 66 to an internal opening 82.

A copper contact 78 may be secured to one of the inner endpieces 28, 30. The copper contact is for the magnetic roller 32. The copper contact 78 receives an AC/DC signal that is applied to the magnetic roller 32 which helps improve the contrast and which will add more or less toner to be attracted to the drum. This is typically controlled by the printer's density setting.

Figure 7:
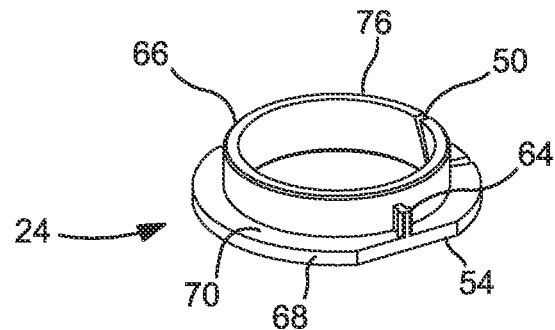
FIG. 7 is a perspective view of the spring bearing used in the roller system of FIG. 1.

FIG. 7 is a perspective view of the spring bearing 24 including the spring relief cut 50, the foot 64, the flat surface 54, the front portion 68, the back portion 66, the lip 70, and the rear surface 76.

Figure 8:
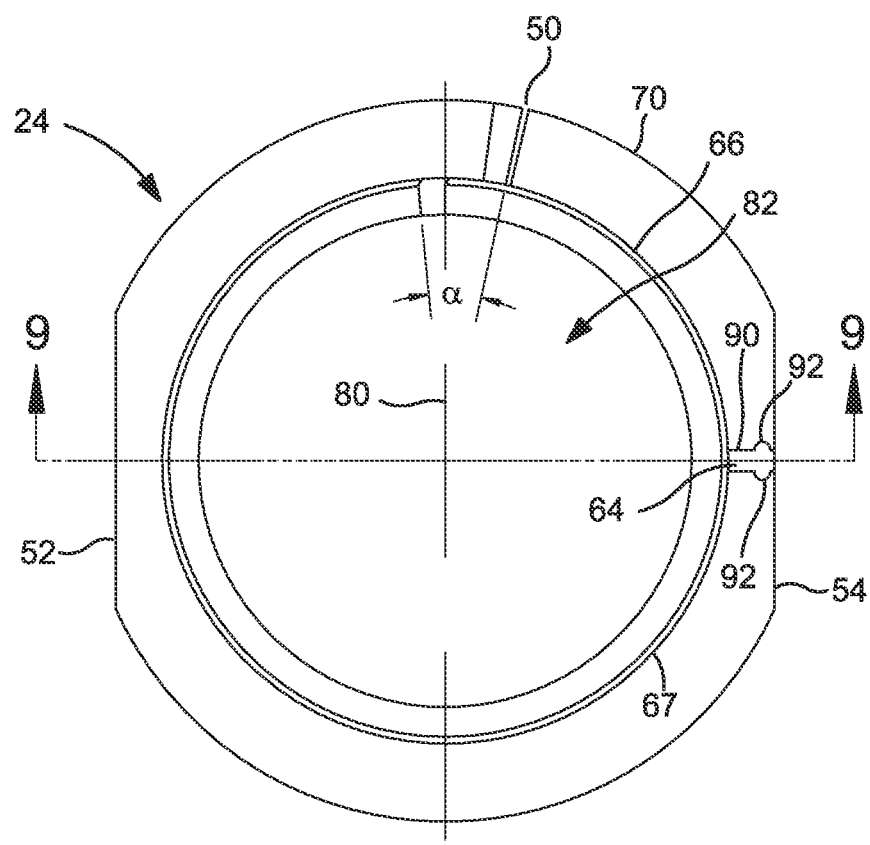
FIG. 8. Is a rear view of the spring bearing used in the roller system of FIG. 1.

Referring now to FIG. 8, which illustrates a rear view of the spring bearing 24, the spring relief cut 50 is angled with respect to the axis 80 which extends parallel to the flat surfaces 52 and 54. The angle a may be in the range of 15 to 20 degrees. The foot 64 may extend from an outer surface 67 of the back portion 66 to the flat surface 54 and may be formed with a constant thickness portion 90 and two opposed arcuate shaped portions 92 adjacent the constant thickness portion 90. The notch 62, as shown in FIG. 5, may be configured or shaped to have a shape which is receptive to the foot 64. The spring bearing 24 further has an internal opening 82.

Figure 9:
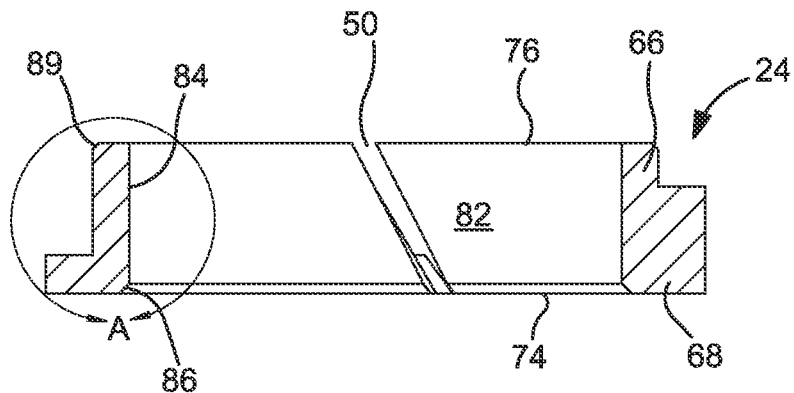
FIG. 9 is a sectional view of the spring bearing taken along line 9-9 of FIG. 8.
Figure 10:
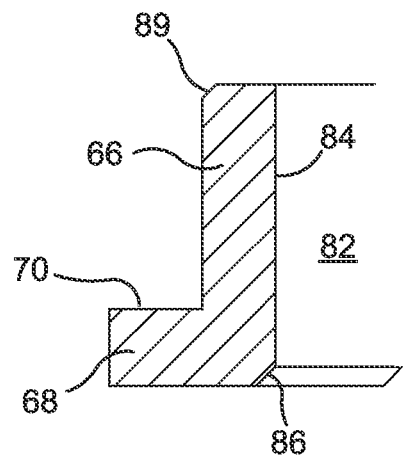
FIG. 10 is an enlarged view of portion A of FIG. 9.

FIG. 9 is a sectional view of the spring bearing 24 taken along lines 9-9 in FIG. 8. As can be seen from FIGS. 9 and 10, the spring bearing 24 includes an internal opening 82 which extends from the front surface 74 of the front portion 68 to the rear surface 76 of the back portion 66. The internal opening 82 may be defined by a linear inner wall section 84 and an adjacent angled wall section 86 which mates with the linear inner wall section 84. If desired, the back portion 66 may have an angled outer wall section 89. As can be seen from FIGS. 9 and 10, the spring bearing 24 may be formed as a unitary structure.

The spring bearing 24 may be formed from a material selected from the group consisting of nylon, acetal, polytetrafluoroethylene (PTFE), ultra high molecular weight polyethylene (UHMW), and IGUS® IGLIDE® J plastic material. The material forming the spring bearing 24 may posses the ability to handle high loads over an extended period of time. Further, the material may be characterized by a low coefficient of friction and low wear rates resulting in longer service life. The material forming the spring bearing 24 may be a plastic material consisting of base plastics, fibers and/or filling materials and one or more solid lubricants. These components may not be in layers, but rather homogeneously compounded. The advantages of such a construction is that: the coefficient of friction, determined by the surface of the plastic material, should be as low as possible; the surface may not be pushed aside by forces acting on the plastic material; and the plastic material should be particularly resistant to wear forces acting on its surface. The solid lubricant(s) may be embedded as microscopic particles in chambers in a fiber reinforced plastic material. From these chambers, the plastic material may release tiny amounts of solid lubricant during movement. Since the solid lubricant(s) is/are embedded in the chambers, they can not be pressed out. They are always there as soon as the plastic material is set in motion, thus helping to lower the coefficient of friction. Any radial pressure acting on the plastic material may be taken by the plastic base material, thus providing support at the contact surface. The plastic base material ensures that the solid lubricant(s) do not receive a surface pressure that is too high. The plastic base material may also be reinforced by fibers and/or filling materials. These additional materials help stabilize the plastic material for applications involving continuous stress.

The spring bearing 24 described herein should provide a number of advantages including (1) preventing banding due to the different radius on the hub of the magnetic rollers; (2) being greaseless (self lubricating); (3) having a low coefficient of friction; and (4) being reusable due to its low wear rate.

There has been provided in accordance with the present disclosure, a spring bearing which may be used in a toner cartridge roller system. While the spring bearing has been described in the context of specific embodiments thereof, other unforeseen alternatives, modifications, and variations may become apparent to those skilled in the art having read the foregoing description. Accordingly, these alternatives, modifications, and variations are intended to be embraced by the broad scope of the following claims.

What is claimed is:

1. A spring bearing having a front surface of a front portion and a rear surface of a back portion opposite said front portion; wherein said back portion is shaped and dimensioned to fit within an opening of an endpiece;
   a lip extending between said front portion and said back portion;
   an angled relief cut extending from said front surface to said rear surface; and
   a first flat exterior surface formed in said lip on a first side and a second flat exterior surface formed in said lip and located on a second side opposed to said first side.

2. The spring bearing of claim 1, wherein said angled relief cut is angled with respect to said first and second flat exterior surfaces.

3. The spring bearing of claim 1, further having a foot extending from an outer surface of said back portion to one of said first and second flat exterior surfaces.

4. The spring bearing of claim 3, wherein said foot has a constant thickness portion and two opposed arcuate portions adjacent said constant thickness portion.

5. The spring bearing of claim 1, further having an internal opening extending from said front surface to said rear surface.

6. The spring bearing of claim 5, wherein said internal opening has a linear wall extending from said rear surface and an angled wall extending from said front surface and mating with said linear wall.

7. The spring bearing of claim 1, wherein said spring bearing is formed from a material selected from the group consisting of nylon, acetal, polytetrafluoroethylene (PTFE), ultra high molecular weight polyethylene (UHMW), and IGUS® IGLIDE® J plastic material.

8. A roller system for a developing cartridge comprising:
   a magnet roller;
   a magnet roller sleeve surrounding said magnet roller;
   a first bushing abutting said magnet roller sleeve; and
   a first spring bearing abutting said first bushing, said first spring bearing having a front surface adjacent said first bushing and a rear surface opposite said front surface
   an angled relief cut extending from said front surface to said rear surface;
   a first endpiece adjacent said first spring bearing and said first spring bearing mating with said first endpiece;
   said first spring bearing having a first flat exterior surface on a first side and a second flat exterior surface on a second side opposed to said first side; and
   said first endpiece having a flat surface and one of said first and second flat exterior surfaces being aligned parallel to said flat surface of said first endpiece.

9. The roller system of claim 8, further comprising said first endpiece having an opening and a notch adjacent said opening and said first spring bearing having a foot which fits into said notch.

10. The roller system of claim 9, further comprising said first spring bearing having a front portion and a back portion and said back portion fitting in said opening in said first endpiece.

11. The roller system of claim 10, wherein said first spring bearing has a lip formed by said front portion and said lip abutting said first endpiece.

12. The roller system of claim 8, further comprising a drive gear for driving said magnet roller and said drive gear being housed in an exterior portion of said first endpiece.

13. The roller system of claim 12, further comprising an outer endpiece abutting said drive gear.

14. The roller system of claim 8, further comprising a hopper magnetic roller assembly having an arcuate portion for housing said magnet roller with said magnet roller sleeve.

15. The roller system of claim 14, further comprising a doctor blade and a sealing blade attached to said hopper magnetic roller assembly.

16. The roller system of claim 8, further comprising a second bushing abutting a second end of said magnet roller sleeve, a second spring bearing abutting said second bushing, and a second endpiece mating with said second spring bearing.

17. The roller system of claim 16, further comprising each of said first and second spring bearings being formed from a material selected from the group consisting of nylon, acetal, polytetrafluoroethylene (PTFE), ultra high molecular weight polyethylene (UHMW), and IGUS® IGLIDE® J plastic material.

* * * * *